United States Patent
Baumann et al.

(10) Patent No.: US 6,404,092 B1
(45) Date of Patent: Jun. 11, 2002

(54) WINDING BAR FOR THE HIGH-VOLTAGE WINDING OF AN ELECTRIC MACHINE, AND A METHOD FOR PRODUCING SUCH A WINDING BAR

(75) Inventors: Thomas Baumann, Wettingen; Reinhard Fried, Nussbaumen; Reinhard Joho, Küttigen; Jörg Oesterheld, Fislisbach, all of (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/290,180

(22) Filed: Apr. 13, 1999

(30) Foreign Application Priority Data

Apr. 18, 1998 (DE) ............................ 198 17 287

(51) Int. Cl.⁷ ................................................ H02K 3/30
(52) U.S. Cl. ...................................... 310/201; 310/208
(58) Field of Search ............................... 310/195, 196, 310/201, 208, 213; 29/605, 825

(56) References Cited

U.S. PATENT DOCUMENTS

| | | | |
|---|---|---|---|
| 2,570,786 A | * 10/1951 | Flynn et al. | 310/208 |
| 2,975,088 A | * 3/1961 | Rossman et al. | 310/208 |
| 4,818,909 A | * 4/1989 | Balke | 310/208 |
| 4,833,354 A | * 5/1989 | Miller | 310/87 |
| 5,066,881 A | * 11/1991 | Elton et al. | 310/213 |
| 5,300,844 A | * 4/1994 | Schuler | 310/215 |
| 5,760,516 A | * 6/1998 | Baumann et al. | 310/201 |
| 5,806,169 A | * 9/1998 | Trago et al. | 29/596 |

FOREIGN PATENT DOCUMENTS

| | | |
|---|---|---|
| AT | 304664 | 5/1972 |
| CH | 321278 | 4/1957 |
| CH | 551100 | 6/1974 |
| DE | 2548328 | 5/1976 |
| DE | 2500819 | 6/1976 |
| EP | 0 570 231 A1 | 11/1993 |
| GB | 1031084 | 5/1966 |
| JP | 60-087374 | 4/1985 |
| JP | 61-034272 | 2/1986 |
| JP | 62-038043 | 2/1987 |
| JP | 3-245748 A | 11/1991 |

* cited by examiner

Primary Examiner—Nestor Ramirez
Assistant Examiner—Dang Dinh Le
(74) Attorney, Agent, or Firm—Burns, Doane, Swecker & Mathis, L.L.P.

(57) ABSTRACT

A winding bar (10) for a high-voltage winding, for example a stator winding of an electric machine, includes a plurality of conductors (13) which are arranged above and/or next to one another in a conductor bundle. The conductor bundle has a rectangular cross section. The conductor bundle is surrounded by an insulation (14). An overall improved electric strength is achieved at the edges without changing the insulation thickness because a thickness (d2) of the insulation (14) on the edges (15) of the winding bar (10) is greater than the thickness (31) of the insulation (14) on the flat sides of the winding bar (10). Preferably, a calibration process is used to shape the edge region.

25 Claims, 4 Drawing Sheets

WINDING BAR FOR THE HIGH-VOLTAGE WINDING OF AN ELECTRIC MACHINE, AND A METHOD FOR PRODUCING SUCH A WINDING BAR

BACKGROUND OF THE INVENTION

1. Field of the Invention

The present invention relates to the field of electric machines. It relates to a winding bar for the high-voltage winding, in particular stator winding, of an electric machine, comprising a plurality of conductors which are arranged above and/or next to one another, and a conductor bundle with a rectangular cross section, the conductor bundle being surrounded outside by an insulation.

In this case, the conductors can be arranged electrically in parallel (bar winding) or be interconnected in series (coil winding). However, in normal operation the voltage between the conductors is substantially smaller than that across the bar insulation.

The invention also relates to a method for producing such a winding bar.

2. Discussion of Background

Winding bars such as are used, for example, in stators of rotating electric machines frequently have the cross section represented by way of example in FIG. 1. The winding bar 10, which is inserted into a slot 11, provided for the purpose, in the stator laminated core 12, comprises a bundle of individual conductors 13 which are arranged running in parallel above and/or next to one another. The conductor bundle, which generally exhibits a rectangular cross section with edges 15, is surrounded on all sides by an insulation 14. As a result of the shape, the electric field at the edges 15 is stronger than on the flat sides of the winding bar 10. Consequently the edge region is particularly susceptible to electric breakdown or electric long-term failure.

In order to achieve the best possible filling of the slot with conductor material, and the best possible transmission of heat via the bar insulation, an attempt is made to achieve the thinnest possible insulation, at least on the flat sides of the bar, which dominate in terms of area. The conventional production of the insulation 14 in the case of winding bars with a rectangular cross section is described, for example, in "Sequenz: Herstellung der Wicklungen elektrischer Maschinen" ["Sequence: Production of windings of electric machines"], Springer-Verlag 1973, pages 128–129. According to this, strips of mica paper, which is coated with glass fabric on a substrate for the purpose of increasing the tensile strength and tear resistance, are wound in the form of layers around the bar or conductor bundle, subsequently impregnated with synthetic resin, molded-in and cured at raised temperatures. The thickness (d1 in FIG. 1) of the insulation 14 is approximately the same on all the flat sides of the winding bar 10 in this method. At the edges 15, it theoretically exhibits the same thickness d1 (see the enlarged partial section in FIG. 2), but becomes smaller in practice because of the locally increased contact pressure (small supporting surface in the edge region) which is produced when the strip is wound around the conductor bundle at a constant rate with a constant winding tension. According to the formula for coaxial cylinders, the maximum electric field at the edges 15 can be specified as:

$$E_{max} = \frac{U}{r1 \cdot \ln\frac{r2}{r1}} = \frac{U}{r1 \cdot \ln\frac{r1+d^*}{r1}}$$

In this case, (in accordance with FIG. 2), U is the on-load voltage, r1 the inner radius of curvature of the insulation 14, r2 the outer radius of curvature of the insulation 14, and d* the thickness (mostly reduced with respect to d1) of the insulation 14 in the region of the edges 15. It is clear from this that the electric field which in the case of radii r1≦3 mm which are technically easy to realize is in any case already distinctly stronger at the edge 15 than in the region of the flat sides, will once again increase as a consequence of the reduced insulation thickness d*, as results in the case of many production methods.

The effects of the increased field strength can be considerable, particularly in the case of continuous electric loading, since the failure rate $t^{-1}$ increases with the electric field in a strongly superlinear fashion. In rough terms, a law of exponents holds between the lifetime t (in h) and electric field E (in kV/mm) in accordance with $$\frac{t}{t_0} = K \cdot \left[\frac{E}{E_0}\right]^{-n},$$

$t_0 = 1$ h and $E_0 = 1$ kV/mm. For a service life exponent n=8 (this is a frequent value in the case of insulating materials for rotating electric machines in accordance with the prior art), this means, for example, that an increase in the field strength by 20% reduces the service life to less than ¼, but conversely that reducing the field by 20% increases the service life by a factor of approximately 6.

Lowering the edge field strength could now be achieved, for example, by going over from an insulation 14 with constant thickness d1 (=d*), as is shown in FIG. 1 and FIG. 2, to an insulation with an angular outer contour (r2=0). This assumption, carrying out a computer model calculation based on the finite elements method for a value of d1=2.5 mm and r1=2.5 mm, produces a reduction in the maximum field strength $E_{max}$ in the edge region of 11%, which corresponds to a computational prolongation of service life by the factor 2.5 in the case of a service life exponent of 8. This factor increases disproportionately with a higher service life exponent (for example factor 4 for n=12).

SUMMARY OF THE INVENTION

Accordingly, one object of the invention is to provide a novel winding bar in which a distinct reduction in the maximum field strength in the edge region is achieved with simple means without the need to increase the thickness of the insulation in the region of the flat sides, as well as to specify a method for producing said bar.

The object is achieved in the case of a winding bar of the type mentioned at the beginning by virtue of the fact that the thickness of the insulation on the edges of the winding bar is greater than the thickness of the insulation on the flat sides of the winding bar. The enlargement of the insulation thickness in the edge region produces a correction of the field lines of the electric field, which leads to the desired reduction in the edge field strength.

A first preferred embodiment of the winding bar according to the invention is defined by virtue of the fact that the insulation on the edges of the winding bar has a curvature with an inner curvature contour and an outer radius of curvature, and that the outer radius of curvature is smaller than the sum of the equivalent inner radius of curvature of the inner curvature contour and the thickness of the insulation on the flat sides of the winding bar. Maintaining an outer radius of curvature differing from zero produces a uniform change, favorable for the field distribution and for the mechanical stability, of the thickness in the edge region.

In principle, such a shaping of the edge regions can be achieved with the aid of a wound insulation when thermoplastic strips are used for the insulation. However, the shaping becomes particularly simple when, in accordance with a second preferred embodiment, the insulation consists of a thermoplastic polymer in which filler particles made from an insulant are distributed. In a preferred development of this, polyetherether ketone (PEEK) is used as the thermoplastic polymer, and mica platelets are used as the filler particles. Instead of PEEK it is also possible to make successful use of other substances such as, for example, polysulfone (PSU) or polyether sulfone (PES).

In accordance with a further preferred embodiment of the invention, the special shaping, used to reduce the edge field strength, of the insulation in the edge region is also extended to the conductors of the conductor bundle surrounded by the insulation in such a way that at least the conductors arranged in the region of the edges respectively comprise a bundle of individual insulated, in particular stranded wires. It hereby becomes possible to use compression molding to bring the conductors themselves into a shape which leads to a further increase in the insulation thickness in the edge region. In this case, the wires can be formed, for example, as round wires, but can also be square (in the manner of miniature ROEBEL bars).

In a preferred development of this embodiment, for the purpose of achieving a smooth outer contour the bundles of the wires are impregnated with a semiconducting binding compound, and for the purpose of coupling to the semiconducting binding compound at least one wire in the bundle of wires is left or made bare. It is hereby possible to minimize an unfavorable influence of the wire bundles on the field distribution. Over and above the smoothing of the outer contour of an individual conductor, the outer contour of the entire conductor bundle can be smoothed when, in accordance with a further embodiment, the conductors of the winding bar are spaced apart from one another by interspaces, and the interspaces are filled with a semiconducting bridging compound which preferably exhibits (in the bar direction) a voltage-limiting behavior which is nonlinear, at least in sections.

The method according to the invention for producing a winding bar, in the case of which winding bar the insulation consists essentially of a thermoplastic material, is defined by virtue of the fact that after the application of the insulation the winding bar is subjected to a calibration process in which there is impressed on the deformable material of the insulation a prescribed edge contour which leads to an increased thickness of the insulation in the region of the edges. The decoupling of the processes of application and shaping renders it possible for the two process steps to be optimized separately and carried out continuously at the same time. The insulation can be applied in this case in particularly uniform layers, which can be effectively shaped, when, in accordance with a first preferred embodiment of the method according to the invention, the insulation is applied by means of a method from the range of the powder-coating methods, in particular spray sintering or thermal spraying, and extrusion methods.

The method according to the invention can be carried out in a particularly quick and precise fashion when, in accordance with a further preferred embodiment, for the purpose of carrying out the calibration process, calibration rolls which are arranged parallel to the middle planes of the winding bar and at a fixed spacing therefrom are moved relative to the winding bar over the surfaces thereof, and within the calibration process a prescribed radius of curvature is impressed on the edges of the winding bar by means of additional edge rollers.

Further embodiments follow from the dependent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
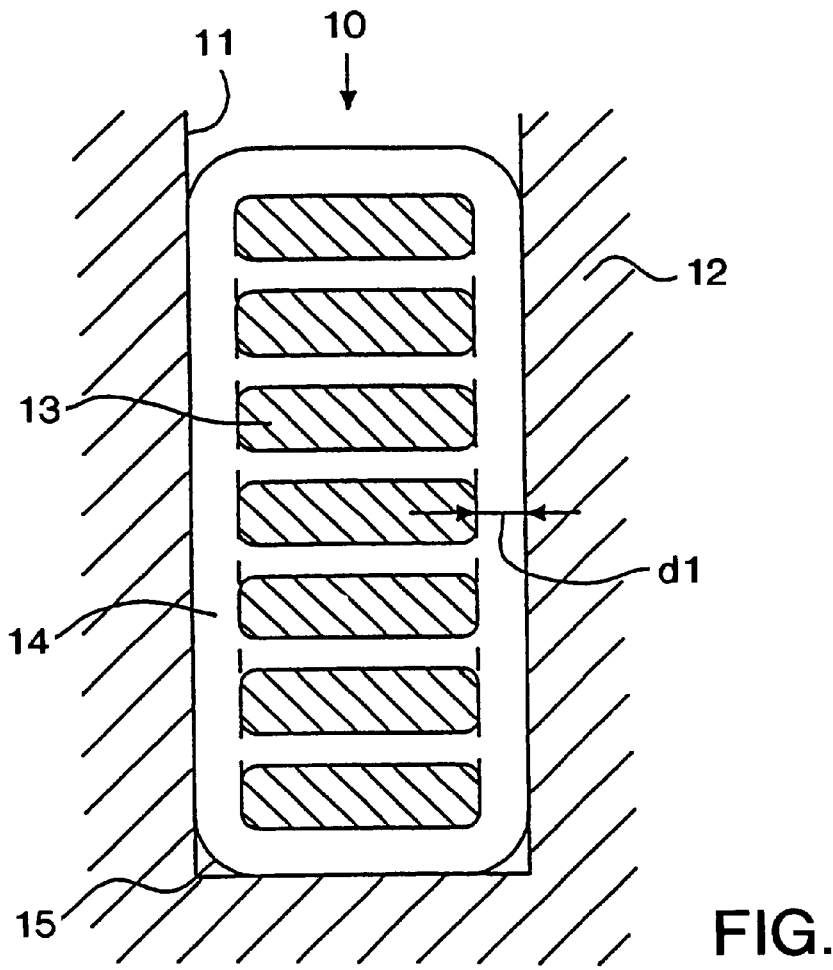
FIG. 1 shows in cross section a winding bar, inserted into a stator slot, according to the prior art, having a wound insulation with an essentially constant thickness d1.
Figure 2:
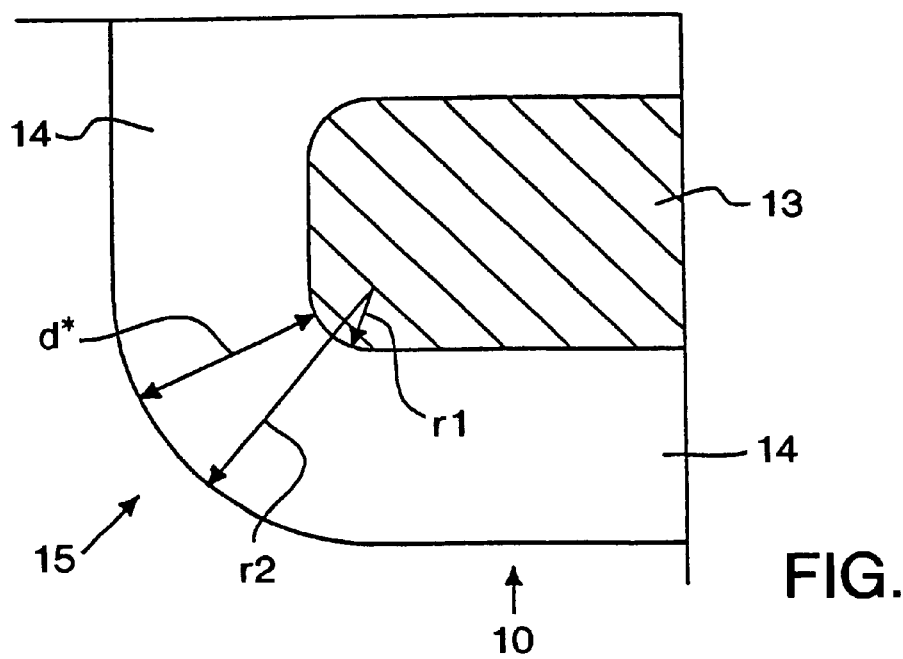
FIG. 2 shows a section in the edge region of the winding bar according to FIG. 1.
Figure 3:
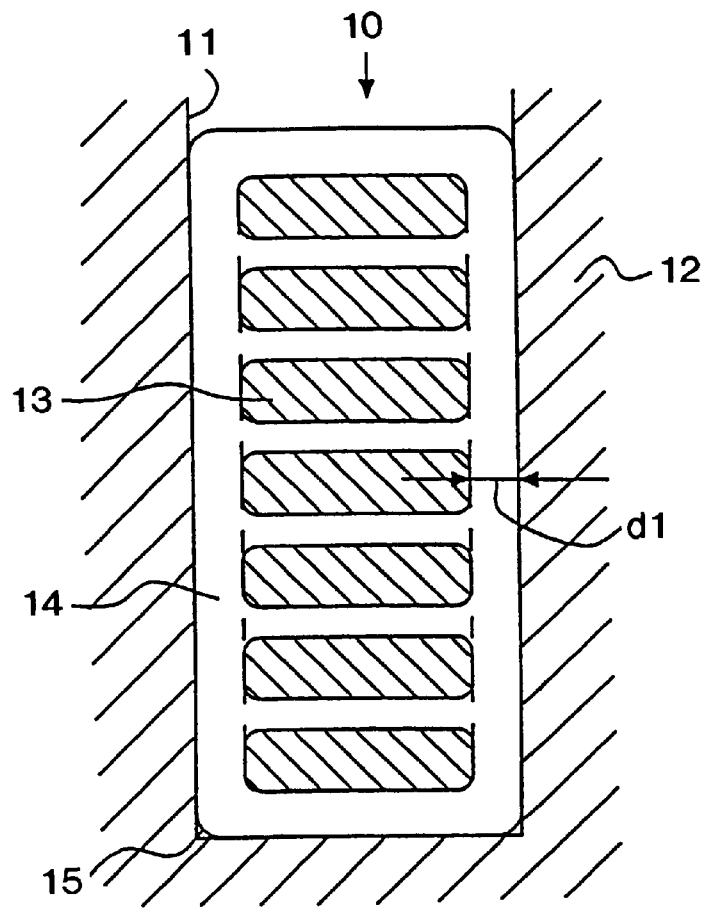
FIG. 3 shows the representation, comparable to FIG. 1, of a first exemplary embodiment of the invention, in which by reducing the outer radius of curvature r3 of the insulation at the edge, the thickness of the insulation is increased in this region.
Figure 4:
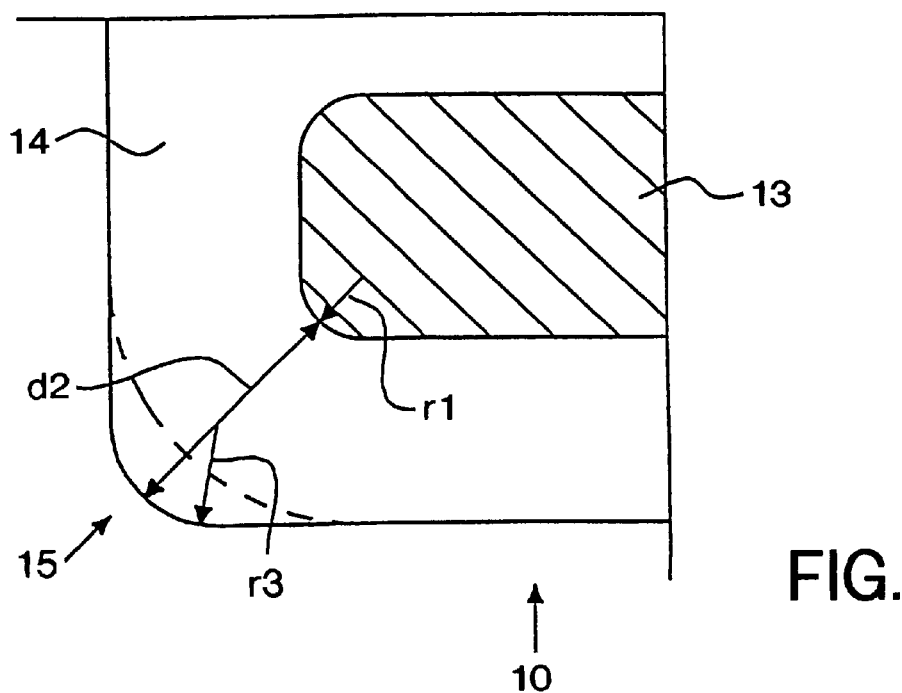
FIG. 4 shows a representation, comparable to FIG. 2, of the edge section of FIG. 3.

Referring now to the drawings, wherein like reference numerals designate identical or corresponding parts throughout the several views, in FIGS. 3 and 4 a first preferred exemplary embodiment of the winding bar according to the invention is reproduced in cross section. The enlargement of the thickness of the insulation 14 of the winding bar 10 in the region of the edges 15 is achieved in this case by virtue of the fact that the radius of curvature r3 at the outside of the insulation 14 is selected to be smaller than the sum of the radius of curvature r1 on the inside of the insulation 14 (or the conductor 13) and the thickness d1 of the insulation on the flat sides of the insulation (see FIG. 3). By comparison with the conventional case of FIGS. 1 and 2 (illustrated by dashes in FIG. 4), this results in a thickness d2 of the insulation 14 in the edge region which is greater than the thickness d1. The thickness d2 is at a maximum for the extreme case with r3=0 (sharp outer edge of the insulation 14).

$$d2_{max} = [\sqrt{2}(r1+d1)] - r1.$$

Setting r1=2.5 mm and d1=4 mm produces $d2_{max}$=6.69 mm, which corresponds to a rise in the maximum insulation thickness at the edge 15 by 67% in comparison with the value d1 on the flat sides.

Starting from the conventional winding and impregnation process as the production method of insulations for the conductors in rotating electric machines, sharp outer edges can theoretically be made for the insulation 14 by deforming the insulation in the impregnated, but not yet cured state. This presupposes the insulation can flow. However, since the normally employed glass substrate of the mica strip is very strong in tension, adequate flow of the insulation will take place only when the glass/mica strip is wound very loosely around the conductor bar (winding tension approximately equal to 0). Such an insulation has, however, the advantage that the strip layers rip very easily and folds can form, with the result that uniform winding of the conductor bundle is no longer ensured. However, uniform winding is a basic assumption for a homogenous and functional insulation.

A sufficiently deformable insulation is to be expected only by selecting a production method for the insulation 14 in which no glass substrate is used. This precondition is fulfilled, for example, by the powder-coating methods of spray sintering and thermal spraying, extrusion methods and methods in which the conductor bundle is wound around with thermoplastic strips and subsequently hot-pressed (see the printed publication EP-A2-0 660 336 in this regard, for example). All the said methods do not yet necessarily of themselves provide the desired effect of increasing the thickness at the edges; it is easily conceivable that, if no additional precautions are taken, the thickness of the insulation 14 at the edges 15 will turn out to be smaller. Consequently, an additional processing step is required to shape the edges. A further requisite condition is that the insulating compound employed, preferably a polymer, can be plastically deformed in a wide temperature range.

Figure 7:
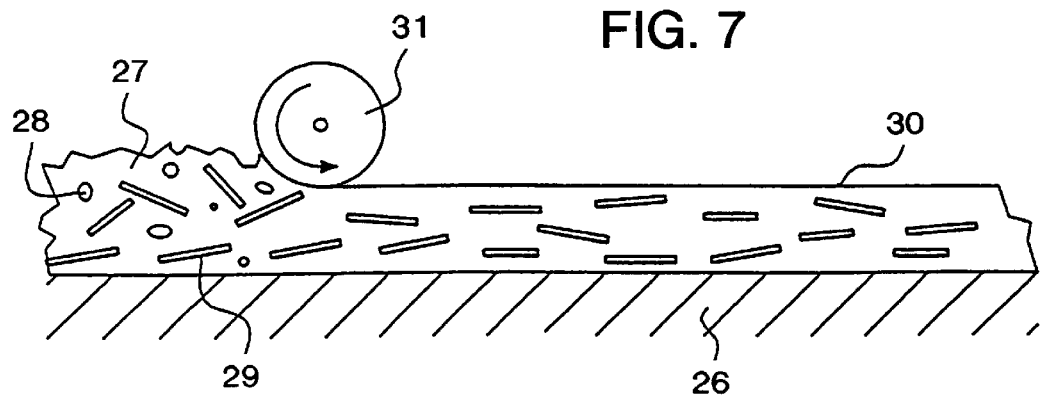
FIG. 7 shows a diagrammatic representation of the effects occurring during the calibration operation according to the invention.
Figure 8:
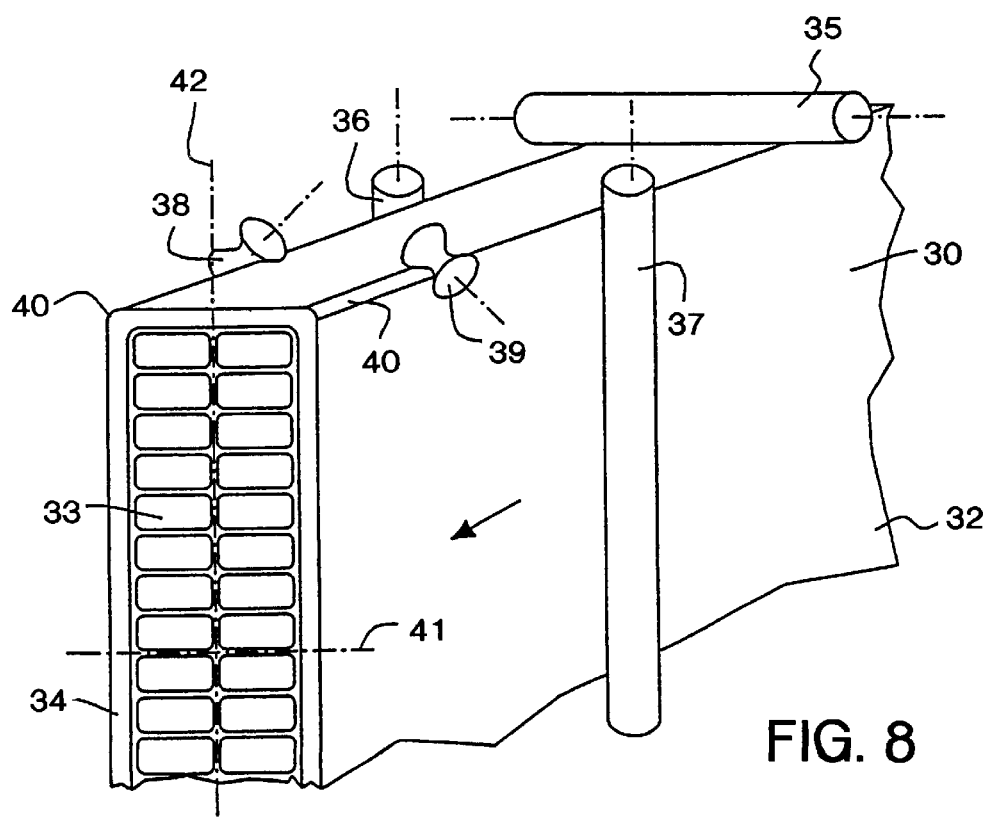
FIG. 8 shows a perspective representation of an exemplary embodiment of the calibration process using the method according to the invention.

The desired, targeted deformation of the insulating compound (the polymer) in the edge region can then be realized, in accordance with FIGS. 7 and 8, by a so-called calibration of the insulation 34 shortly after the spraying on (this applies for thermal spraying) or after the sintering (this applies for spray sintering) by guiding calibration rolls or calibration rollers on the flat sides of the insulation in accordance with the diagrammatic representation in FIG. 7 in a defined way over the still deformable insulating material. The insulation compound 27 applied to the base 26, which also still contains air bubbles 28 in addition to the mixed-in filler particles 39 (for example mica platelets), is compacted in this case by the calibration roll 31 which is rolled at a defined spacing over the base 26, and rendered of uniform thickness.

In a preferred embodiment of the method, the insulation compound is formed by successive application (spraying on) of a plurality of thin layers. Calibration is then carried out after each spraying operation. This results additionally in positive effects by virtue of the fact that the air bubbles 28 which may be present are pressed out of the insulation, and that short-fiber or platelet-shaped filler particles 29 are orientated into a possibly desired, directed position parallel to the surface (right-hand side in FIG. 7).

EXAMPLE 1

A mechanical mixture of polyetherether ketone (PEEK) and mica in the ratio of 1:1 is applied at room temperature to a rectangular conductor (with conductors 33) by means of electrostatic spraying (subvariant of the spray sintering method). A layer with a thickness of approximately 0.2 mm adheres on all sides. The polymer component of the powder is fused by heating in a recirculating air oven (380° C., 10 min). Directly thereafter, the winding bar 32 is calibrated on both end faces and broad sides by in each case two roll pairs situated one behind the other (calibration rolls 35,36,37) (FIG. 8). The calibration rolls 35,36,37 are arranged in this case parallel to the middle planes 41,42 of the winding bar 32 and at a fixed spacing therefrom. In order to avoid excessive withdrawal of heat and consequent premature solidification of the polymer, the rollers preferably consist of glass tubes or other thermostable material with as low as possible a thermal conductivity. The calibration can be realized either by guiding the winding bar 32 between the fixed calibration rolls 35,36,37 (direction of arrow in FIG. 8) or, more advantageously, by guiding the rolls over the fixed bar (concept of robot or winding machine).

EXAMPLE 2

As in Example 1, but with heated calibration rolls 35,36, 37. The roll temperature is approximately 330° C. in this case.

EXAMPLE 3

A mechanical mixture of polyetherether ketone (PEEK) and mica in the proportion of 1:1 is applied to a rectangular conductor by means of flame spraying up to the desired final thickness. The conductor is preheated in this case to approximately 180° C. The calibration is performed in accordance with Examples 1 and 2.

EXAMPLE 4

As in Example 3, but the final thickness is not reached in a single pass but by repeated spraying and calibration of thin layers with a thickness of approximately 0.2 mm. By contrast with Example 3, this procedure has the advantage that the mica platelets are orientated in the desired way parallel to the surface, and the bubble content of the insulation drops virtually to zero.

EXAMPLE 5

As in Example 4, but in addition to the flat sides of the winding bar 32, the edges 40 are also calibrated with special edge rollerers 38,39 which are preferably arranged in the process direction downstream of the calibration rolls 35,36, 37. An outer radius of curvature (r3 in FIG. 4) of the insulation 34 is hereby defined, and the result is that the mica platelets are favorably aligned in the edge region, which is particularly awkward electrically.

EXAMPLE 6

As in Examples 1 to 5, but PEEK/mica compound is processed instead of the PEEK/mica mixture.

EXAMPLE 7

Strips, consisting of polysulfone (PSU)—filled with 30% by mass of mica—are wound around a rectangular conductor. The number of layers of wound-on strips is 5–10% greater than corresponds to the desired insulation thickness. The calibration is performed after the winding, in accordance with Example 2 using heated rolls. The roll temperature is 250° C. in this case.

Figure 5:
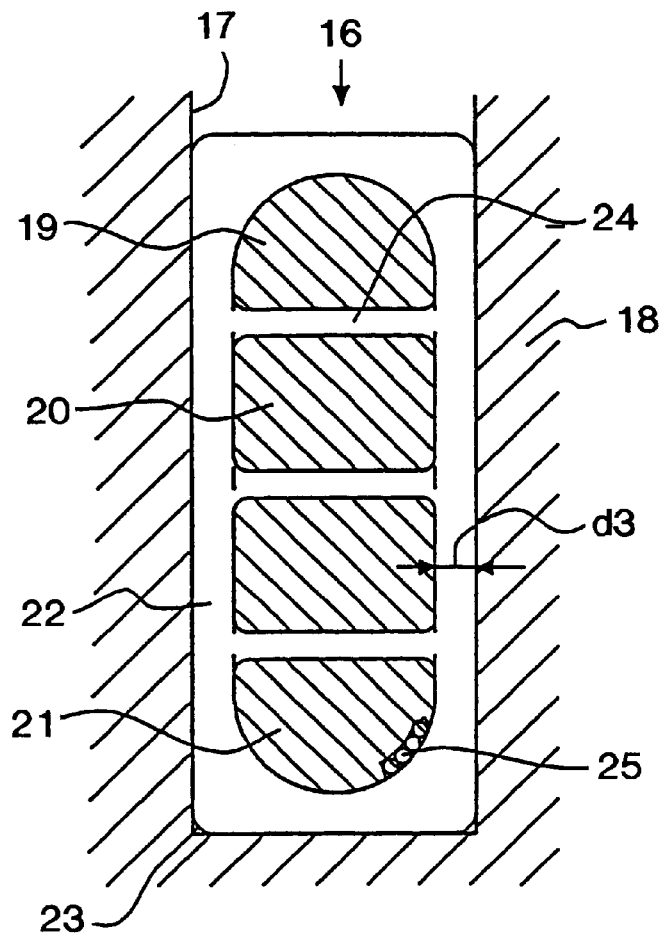
FIG. 5 shows a representation, comparable to FIG. 3, of a second exemplary embodiment of the invention in which for the purpose of further increasing the insulation thickness in the edge region the adjoining conductor is rounded off more steeply.
Figure 6:
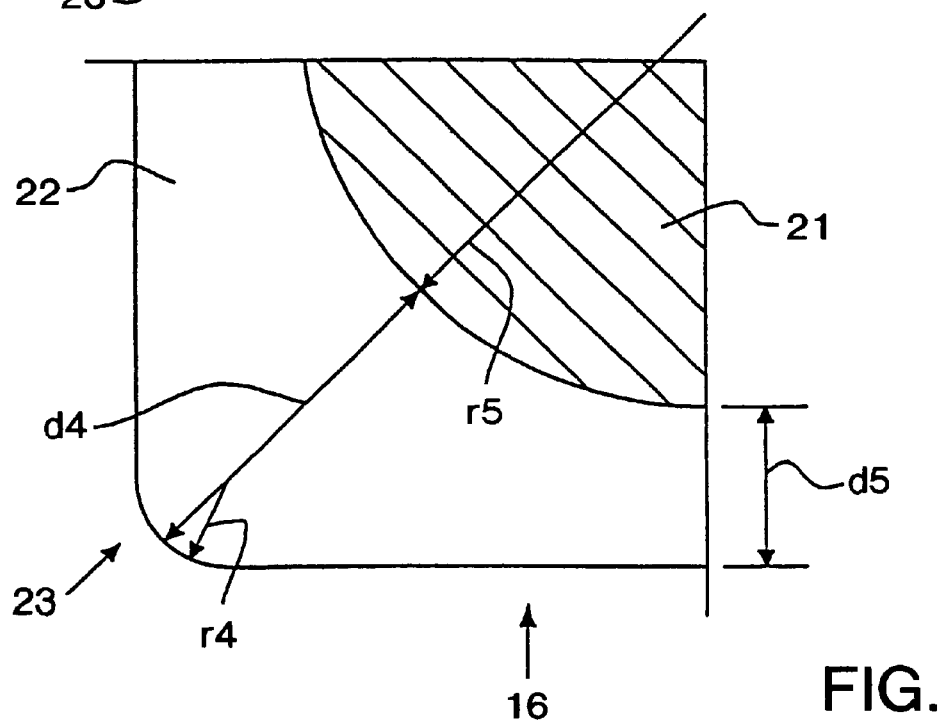
FIG. 6 shows a representation, comparable to FIG. 4, of the edge section of FIG. 5.

A further preferred exemplary embodiment for a winding bar according to the invention is reproduced in FIGS. 5 and 6. The winding bar 16, which is inserted into the slot 17 of the stator laminated core 18, comprises a plurality of conductors 19,20,21 which are surrounded by an insulation 22. At least the outer conductors 19,21, preferably also the other conductors 20, in this case comprise stranded, insulated wires 25. The outer conductors 19,21 are rounded off in accordance with the principles of field theory (Rogowski profiles) (radius of curvature r5). The rounding off of the conductors 19,21 is simplified by the structuring into the wires 25. By comparison with the thickness d3 on the flat sides (FIG. 5), rounding off the conductors 19,21 produces an increased thickness d4 in the region of the edges 23 (FIG. 6) which can be further enlarged by virtue of the fact that the radius of curvature r4 is reduced at the outer edge of the insulation 22. In this case, the (minimum) thickness d5 relative to the narrow side of the winding bar 16 can be determined using the following formulas:

$$d3 = \frac{U}{E_{zul}}$$

with the operating voltage U and the maximum permissible field strength $E_{zul1}$. It then holds for d5 that $$E_{zul} = \frac{2U\sqrt{\left(\frac{\alpha}{2 \cdot r5}\right)^2 - 1}}{(\alpha - 2 \cdot r5)\ln\left[\frac{\alpha}{2 \cdot r5} + \sqrt{\left(\frac{\alpha}{2 \cdot r5}\right)^2 - 1}\right]}$$

where $$\alpha = 2 \cdot r5 + 2 \cdot d5$$

By substituting the equations in one another and solving for d5, it is then possible for example, to calculate the thickness d5 as a function of d3. The circular configuration is specified by way of example. An even further reaching optimization as regards the field strength can be found by using curvature contours of the conductors 19,21 which are not exactly circular.

In order to achieve a flat outer contour, more favorable with regard to the electric field strength, of the conductor bundle 19,20,21 in the insulation 22, the interspaces 24 between the conductors 19,20,21 can be filled up with a semiconducting bridging compound. A comparable effect is produced when the "green" bar, that is to say the conductor bundle before embedding in the insulation 22, is provided with a semiconducting coating. If the semiconducting bridging compound or the semiconducting coating consists of a material which exhibits an electrically nonlinear behavior, voltage impulse waves can additionally be distributed linearly between the conductors 19,20,21.

A further improvement results when the wires 25 comprising the conductors 19,20,21 are compressed in a press after the stranding in order to keep the CU component in the conductor as high as possible. In particular, it is favorable in terms of the electric behavior if the conductors comprising the wires 25 are pressed into a mould and impregnated with a semiconducting binding compound. This also results in a flat outer contour which is important for the maximum field strength. The coupling to the semiconducting binding compound is preferably effected in this case by leaving at least one round wire bare.

Obviously, numerous modifications and variations of the present invention are possible in light of the above teachings. It is therefore to be understood that, within the scope of the appended claims, the invention may be practiced otherwise than as specifically described herein.

| LIST OF DESIGNATIONS | |
|---|---|
| 10, 16 | Winding bar |
| 11, 17 | Slot |
| 12, 18 | Stator laminated core |
| 13 | Conductor |
| 14, 22 | Insulation |
| 15, 23 | Edge |
| 19, 20, 21 | Conductor |
| 24 | Interspace |
| 25 | Round wire |
| 26 | Base |
| 27 | Insulating compound |
| 28 | Air bubble |
| 29 | Filler particle |
| 30 | Surface |
| 31 | Calibration roll |
| 32 | Winding bar |
| 33 | Conductor |
| 34 | Insulation |
| 35, 36, 37 | Calibration roll |
| 38, 39 | Edge rollerer |
| 40 | Edge |
| 41, 42 | Middle plane |
| r1, . . . , r5 | Radius of curvature |
| d*, d1, . . . , d5 | Thickness (Insulation) |

What is claimed is:

1. A winding bar for a high-voltage winding of an electric machine, comprising:
    a plurality of conductors which are arranged above and/or next to one another; and
    a conductor bundle with a rectangular cross section, the conductor bundle being surrounded outside by an insulation, wherein a thickness of the insulation on the corners of the winding bar is greater than a thickness of the insulation on the flat sides of the winding bar and wherein the insulation on the corners of the winding bar has a curvature with an inner curvature contour and an outer radius of curvature;
        wherein the outer radius of curvature is smaller than a sum of the equivalent inner radius of curvature of the inner curvature contour and the thickness of the insulation on the flat sides of the winding bar.

2. The winding bar as claimed in claim 1, wherein the inner curvature contour is circular.

3. A winding bar as claimed in claim 1, wherein the inner curvature contour is field-optimized.

4. The winding bar as claimed in claim 1, wherein the insulation consists of a thermoplastic polymer in which filler particles made from an insulant are distributed.

5. The winding bar as claimed in claim 4, wherein polyetherether ketone (PEEK) is used as the thermoplastic polymer, and mica platelets are used as the filler particles.

6. The winding bar as claimed in claim 1, wherein at least the conductors arranged in the region of the corners respectively comprise a bundle of individual insulated wires.

7. The winding bar as claimed in claim 6, wherein for the purpose of achieving a smooth outer contour the bundles of the wires are impregnated with a semiconducting binding compound.

8. The winding bar as claimed in claim 7, wherein for the purpose of coupling to the semiconducting binding compound at least one wire in the bundle of wires is left or made bare.

9. The winding bar as claimed in claim 6, wherein the wires are stranded wires.

10. The winding bar as claimed in claim 1, wherein the conductors of the winding bar are spaced apart from one another by interspaces and wherein for the purposes of achieving a smooth outer contour the interspaces are filled with a semiconducting bridging compound.

11. A method for producing a winding bar as claimed in claim 1, in the case of which winding bar the insulation consists essentially of a thermoplastic material, wherein after the application of the insulation the winding bar is subjected to a calibration process in which there is impressed on the deformable material of the insulation a prescribed edge contour which leads to an increased thickness of the insulation in the region of the edges.

12. The method as claimed in claim 11, wherein the insulation is applied by a powder-coating method.

13. The method as claimed in claim 12, wherein the insulation is applied sequentially in a plurality of layers.

14. The method as claimed in claim 13, wherein the calibration process is carried out after the application of each individual layer.

15. The method as claimed in claim 13, wherein the layers are less than 1 millimeter thick.

16. The method as claimed in claim 13, wherein the layers are less than 0.2 millimeters thick.

17. The method as claimed in claim 12, wherein the powder-coating method is one of a spray sintering method, a thermal spraying method, and an extrusion method.

18. The method as claimed in claim 11, wherein for the purpose of carrying out the calibration process calibration rolls which are arranged parallel to middle planes of the winding bar and at a fixed spacing therefrom, are moved relative to the winding bar over the surfaces of the winding bar.

19. The method as claimed in claim 18, wherein within the calibration process a prescribed radius of curvature is impressed on the edges of the winding bar by means of additional edge rollers.

20. The method as claimed in claim 19, wherein the edge rollers are arranged downstream of the calibration rolls in the process direction.

21. The method as claimed in claim 11, wherein the insulation is applied at raised temperatures, and the calibration process is carried out as long as the applied insulation is still at raised temperatures.

22. The method as claimed in claim 21, wherein use is made of calibration rolls or calibration rollers, which consist of a material with a low thermal conductivity.

23. The method as claimed in claim 22, wherein the calibration rolls or calibration rollers consist of glass.

24. The method as claimed in claim 21, wherein use is made of calibration rolls or calibration rollers which are heated to raised temperatures during the calibration process.

25. The winding bar of claim 1, wherein the high-voltage winding is a stator winding.

* * * * *